UNITED STATES PATENT OFFICE.

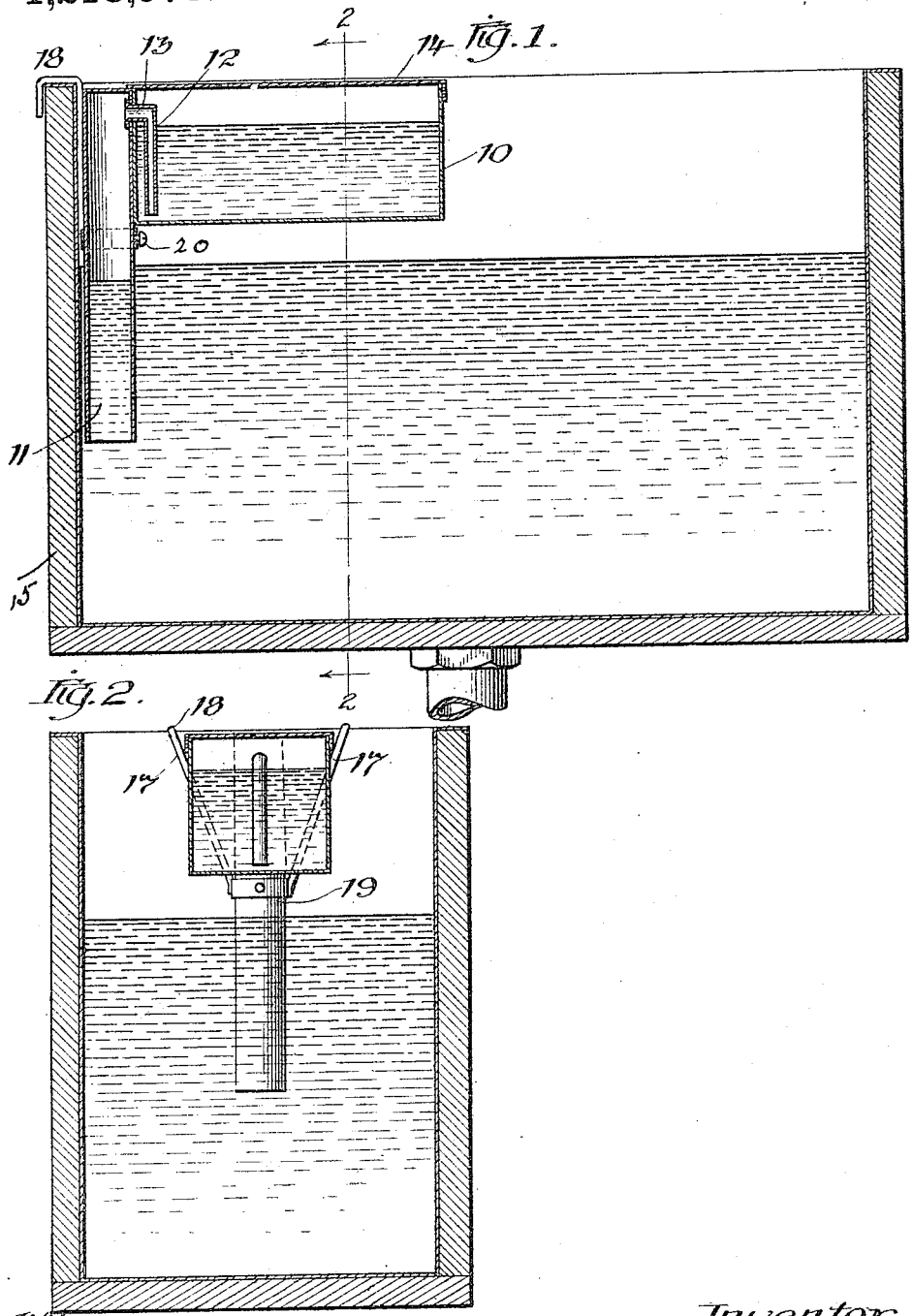

CHARLES W. THORNTON, OF CHICAGO, ILLINOIS, ASSIGNOR, BY MESNE ASSIGNMENTS, OF ONE-HALF TO STANDARDIZED PRODUCTS COMPANY, A CORPORATION OF ILLINOIS, AND ONE-FOURTH TO ERNEST C. LADD AND ONE-FOURTH TO HUBERT HOWARD, BOTH OF CHICAGO, ILLINOIS.

DISINFECTING DEVICE FOR FLUSH-TANKS.

1,213,978.  Specification of Letters Patent.  Patented Jan. 30, 1917.

Application filed November 26, 1915. Serial No. 63,375.

*To all whom it may concern:*

Be it known that I, CHARLES W. THORNTON, a citizen of the United States, and a resident of Chicago, in the county of Cook and State of Illinois, have invented certain new and useful Improvements in Disinfecting Devices for Flush - Tanks: and I do hereby declare that the following is a full, clear, and exact description thereof, reference being had to the accompanying drawings, and to the characters of reference marked thereon, which form a part of this specification.

This invention relates to a novel dispensing device designed to dispense charges or doses of solution, such as an antiseptic or deodorizing solution, into a body of water or other liquid so as to charge said liquid with a desired percentage of the solution.
The device has been designed with more especial reference to its adaptation to the flush tank of a water closet, the purpose being to dispense a charge or dose of the antiseptic or deodorizing solution in the water at the time the closet is flushed so as to thereby sterilize or deodorize the bowl.

Among the objects of the invention is to provide a device of this general character which is automatically operated by the changing levels of the water within the tank and by which small uniform dosages of the solution may be discharged into the water with a close degree of accuracy as to the quantity.
Further objects are to improve and simplify devices of this general character and the invention consists in the combination and arrangement of the parts shown in the drawings and described in the specification and is pointed out in the appended claims.

While the device has been adapted primarily for the use above stated, it will be understood that it may be adapted to other similar uses where like conditions of mixing one liquid with another exists.

In the drawings:—Figure 1 is a vertical sectional view of a device embodying my invention showing a portion of the flush tank. Fig. 2 is a section on the line 2—2 of Fig. 1.
As shown in the drawings 10 designates a receptacle or cup for the solution.

11 designates a pipe or tube which is attached to one end of the cup in any suitable manner as by soldering.

12 designates a short L-shaped tube which is located within the cup 10 and with its laterally directed portion 13, which is at the upper end thereof, extending through the adjacent wall of the cup and into the descending pipe 11. The tube 12 is considerably smaller than the pipe 11 and extends at its lower end almost to the bottom of the cup 10. The cup 10 need not necessarily be closed, but for the purposes of cleanliness and sanitation it is shown as provided with a removable perforated cover or lid 14.

In its relation to the flush tank 15, or any other tank with which the device may be employed, said device may be supported on one wall of the tank by any suitable form of supporting hanger or bracket. The hanger or bracket herein shown comprises two members, 17, 17, which are formed at their upper ends with hooks 18 that hook over the upper edge of one wall of the tank. Said arms converge downwardly toward each other and merge into, or are connected with, a bracket lug 19 that is provided with an opening through which the descending pipe 11 of the device extends. Said pipe may be adjustably fixed to the suspending bracket by means of a set screw 20 which extends through the bracket lug and impinges at its inner end against said pipe.

It will be understood that any other form of bracket or support may be employed for sustaining the device in proper position relatively to the water level in the tank. It is desirable, however, for reasons hereafter stated, that the supporting means be so arranged that the device may be vertically adjusted.

In the use of the device the cup 10 is filled with an antiseptic or other solution which it is desired to intermittently dispense in small charges or doses into the water or other liquid in the tank. Assuming the tank to have just been emptied and is again filling, as the level of the water rises therein, the lower end of the pipe 11 is closed and thereafter during the rise of the water level in the tank, the air column in said pipe is compressed until the hydraulic head in the tank, measured from a given water level therein to the lower end of the pipe 11, exceeds the hydraulic head measured from the level of the solution in the cup 10 to the bottom of the tube 12. When said hydraulic head in the tank exceeds that in the cup, a portion of the air which has been compressed in the pipe 11 is forced from the pipe 11 through the tube 12, and water rises in the pipe 11. This condition is shown in Fig. 1, wherein it is observed that the pressure of air in the upper part of the pipe 11 has displaced or pressed downwardly the solution from the tube 12. When the water is subsequently drained from the flush tank the lowering of the water level in the pipe 11 serves to reduce the air pressure in the said pipe and the tube 12 to an extent to cause a small charge or dose of the antiseptic solution to pass upwardly through the pipe 12 into the pipe 11 wherein it intermingles with the water. As soon as the water level recedes below the lower end of the pipe 11, said pipe is back vented and the siphonic action ceases. The foregoing operations occur at each filling and discharge of the tank.

By adjusting the device vertically with respect to the water level in the manner above described I am enabled to vary the amount of the dose discharged into the pipe 11 at each operation, the dosage growing smaller as the device is raised and larger as the device is lowered.

In order to simplify the drawings I have not disclosed the means for discharging the main tank and for controlling its refilling but it will be understood that any suitable mechanism may be employed for this purpose.

It will be understood that the structural details of the device shown are capable of some variation within the scope and spirit of the invention and the invention is not limited to such details except as the same are hereafter made the subject of specific claims.

I claim as my invention:—

1. A device to dispense small dosages of a solution into a body of liquid, comprising a receptacle for the solution which is open to the atmosphere, a pipe leading downwardly therefrom and extending above the level of the solution in the receptacle and a dispensing tube within said receptacle, said tube extending upwardly from a point near the bottom of the receptacle and discharging at its upper end into the upper end of said pipe and made of a diameter considerably smaller than that of the pipe.

2. A device to dispense small dosages of a solution into a body of liquid, comprising a receptacle for the solution which is open to the atmosphere, a pipe leading downwardly therefrom and extending above the level of the solution in the receptacle and a dispensing tube within said receptacle, said tube extending upwardly from a point near the bottom of the receptacle and discharging at its upper end into the upper end of said pipe and made of a diameter considerably smaller than that of the pipe, a supporting bracket for said device and means whereby the pipe may be vertically adjusted relatively to said bracket.

3. The combination with a tank to contain a body of liquid and a receptacle to contain a solution and open to atmospheric pressure, of a pipe communicating with the top of said receptacle and adapted to dip into said body of liquid, and a dispensing tube of considerably smaller diameter than the pipe within the receptacle, said tube extending upwardly from a point near the bottom of the receptacle and discharging at its upper end into the upper end of the pipe.

In testimony, that I claim the foregoing as my invention I affix my signature, in the presence of two witnesses, this 20th day of November, A. D. 1915.

CHARLES W. THORNTON.

Witnesses:
W. L. HALL,
R. WILLNER.

Copies of this patent may be obtained for five cents each, by addressing the "Commissioner of Patents, Washington, D. C."